UNITED STATES PATENT OFFICE.

THERON L. HEALY, OF BATTLECREEK, MICHIGAN.

CONDIMENT.

SPECIFICATION forming part of Letters Patent No. 701,037, dated May 27, 1902.

Application filed December 21, 1901. Serial No. 86,745. (No specimens.)

*To all whom it may concern:*

Be it known that I, THERON L. HEALY, a citizen of the United States, residing at the city of Battlecreek, in the county of Calhoun and State of Michigan, have invented a certain new and useful Condiment, of which the following is a specification.

This invention relates to a new and improved food product or condiment; and the object of the invention is to provide a condiment in which a proper amount of the seasoning flavor of onion can be made use of at any time without the necessity of specially dressing and preparing onions for the purpose and one that will not undergo any chemical change or become soured. The fresh raw onion has, of course, the best flavor, and it is the object of this invention to retain and impart that flavor whenever desired in a satisfactory manner by use of a compound which may be applied in a dry state from a dredge or salt-shaker. It was only after repeated experiments that I succeeded in accomplishing the object in view and producing the effect sought for.

In carrying out my invention raw onions are first ground or chopped very fine. This may be accomplished by a chopping-knife, or the onion may be passed through the machine commonly referred to as a "meat-grinder," or the result may be otherwise accomplished. The raw onion thus prepared is mixed with raw flour and the whole is carefully dried without submitting the same to a baking temperature, the object being to in no wise cook the finely-divided mass of onion. After the mass composed of flour and onion has been thoroughly dried until it is brittle it is reduced to a powdered state, in which condition it will be found to preserve the onion flavor and can be used in the same manner as table-salt or pepper.

The material is very convenient in the seasoning of soups and can be used wherever onions are used as a flavoring in cooking and will be found exceedingly practical and convenient for such use.

Having thus described my invention, what I therefore claim as new, and desire to secure by Letters Patent thereon, is—

1. The new article of manufacture herein described consisting of a union of finely-divided uncooked onions with flour, and the mass dried and reduced to a powdered state for the purpose set forth.

2. A powdered condiment for table and culinary use composed of uncooked onions and flour, substantially as described.

3. A condiment for table and culinary use, composed of uncooked onions and flour, the two substances being thoroughly incorporated, dried and reduced to powder, substantially as and for the purpose set forth.

In witness whereof I have hereunto set my hand and seal in the presence of two witnesses.

THERON L. HEALY. [L. S.]

Witnesses:
CHARLES HARBECK,
M. E. TRUITT.